United States Patent
Robertson

(10) Patent No.: US 7,014,406 B2
(45) Date of Patent: Mar. 21, 2006

(54) ANTI-STRIP-OUT FASTENER

(75) Inventor: Jerry Wayne Robertson, Adair, KY (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/753,219

(22) Filed: Jan. 7, 2004

(65) Prior Publication Data

US 2005/0147480 A1   Jul. 7, 2005

(51) Int. Cl.
*F16B 39/28* (2006.01)

(52) U.S. Cl. .................. 411/161; 411/181; 411/185; 411/187; 411/188; 411/959; 411/957

(58) Field of Classification Search .............. 411/161, 411/185, 186, 187, 188, 957, 959, 181
See application file for complete search history.

(56) References Cited

U.S. PATENT DOCUMENTS

| | | | | |
|---|---|---|---|---|
| 378,857 A | * | 2/1888 | Woodford | 411/396 |
| 1,894,708 A | * | 1/1933 | Sardeson | 411/176 |
| 3,389,734 A | * | 6/1968 | Gutshall | 411/185 |
| 3,605,845 A | * | 9/1971 | Junker | 411/185 |
| 3,640,326 A | | 2/1972 | Brown | |
| 3,825,051 A | | 7/1974 | Sigmund | |
| 4,223,711 A | * | 9/1980 | Tabor | 411/188 |
| 4,705,441 A | | 11/1987 | Arnold | |
| 4,764,066 A | | 8/1988 | Terrell et al. | |
| 4,808,050 A | * | 2/1989 | Landt | 411/188 |
| 4,812,095 A | | 3/1989 | Piacenti et al. | |
| 4,820,235 A | | 4/1989 | Weber et al. | |
| 4,842,463 A | | 6/1989 | Landt | |
| 5,183,359 A | | 2/1993 | Barth | |
| 5,199,839 A | | 4/1993 | DeHaitre | |
| 5,302,066 A | * | 4/1994 | Bieschke et al. | 411/181 |
| 5,356,253 A | * | 10/1994 | Whitesell | 411/188 |
| 5,528,812 A | * | 6/1996 | Muller | 29/432.2 |
| 5,570,983 A | | 11/1996 | Hollander | |
| 5,613,815 A | * | 3/1997 | Muller | 411/181 |
| 5,622,464 A | | 4/1997 | Dill et al. | |
| 5,683,217 A | | 11/1997 | Walther et al. | |
| 5,746,560 A | | 5/1998 | Barth et al. | |
| 5,779,417 A | | 7/1998 | Barth et al. | |
| 5,879,119 A | | 3/1999 | Robinson | |
| 6,135,689 A | * | 10/2000 | Matsunami | 411/311 |
| 6,302,629 B1 | | 10/2001 | Hsiao | |
| 6,318,940 B1 | * | 11/2001 | Mitts | 411/188 |
| 6,394,725 B1 | | 5/2002 | Dicke | |
| 6,558,097 B1 | * | 5/2003 | Mallet et al. | 411/399 |
| 6,817,815 B1 | * | 11/2004 | Ross | 411/180 |

FOREIGN PATENT DOCUMENTS

| | | | | |
|---|---|---|---|---|
| DE | 2908499 | * | 9/1980 | 411/188 |
| JP | 2089805 | | 3/1990 | |
| JP | 7019218 | | 1/1995 | |

* cited by examiner

*Primary Examiner*—Katherine Mitchell
(74) *Attorney, Agent, or Firm*—Harness, Dickey & Pierce, P.L.C.

(57) ABSTRACT

A fastener includes an axial shank and a clamping face extending radially from the shank. A plurality of serrations are formed on the clamping face and extend radially from a shank periphery to an outer periphery of the clamping face. The shank periphery is axially displaced away from the clamping face relative to the outer periphery of the clamping face to define a ramped surface.

19 Claims, 6 Drawing Sheets

ANTI-STRIP-OUT FASTENER

FIELD OF THE INVENTION

The present invention relates to an anti-strip out fastener and associated method.

BACKGROUND OF THE INVENTION

Fasteners for attaching two thin panels together often cause strip out when the torque required for drilling or tapping ("tapping torque") the fasteners is statistically close to the torque cause stripping ("stripping torque"). At the same time, such fasteners must have good gripping properties and avoid marring a finished panel surface when tapped into the panel. Current fastener designs attempt to balance these requirements with various degrees of success; however fasteners with improved anti-strip-out features are still desirable.

SUMMARY OF THE INVENTION

The present teaching provides for an anti-strip fastener. The fastener includes an axial shank and a clamping face extending radially from the shank. The fastener also includes a plurality of serrations connected to the clamping face and extending radially from a shank periphery to an outer periphery of the clamping face. The serrations profile is such that improved gripping is provided without marring the surface beyond the head diameter. The shank periphery is axially displaced away from the clamping face relative to the outer periphery of the clamping face. The fastener can also include a washer bounding the clamping surface.

The present teaching provides for a method of increasing anti-strip out resistance for a fastener having a head with a clamping surface having a first boundary, and a shank extending from the head by providing a convex or ramped configuration on the clamping surface with a plurality of serrations. The serrations extend radially between the shank and the first boundary, such that the serrations define the convex surface having an axial height that increases from the first boundary of the clamping face to the shank and is operable to provide anti-strip out resistance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

Figure 1:
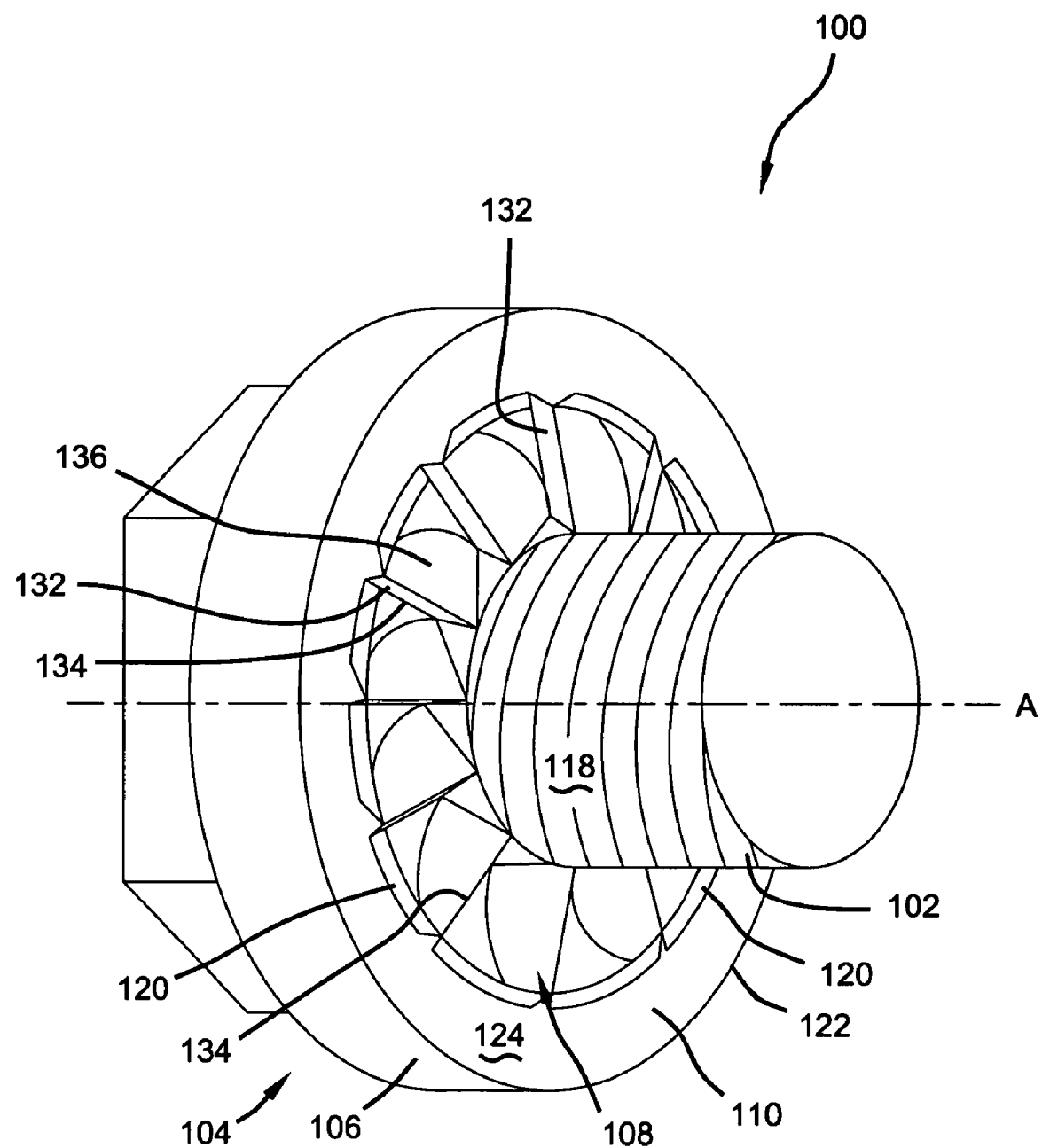
FIG. 1 is a perspective view of a fastener according to the present teachings.
Figure 2:
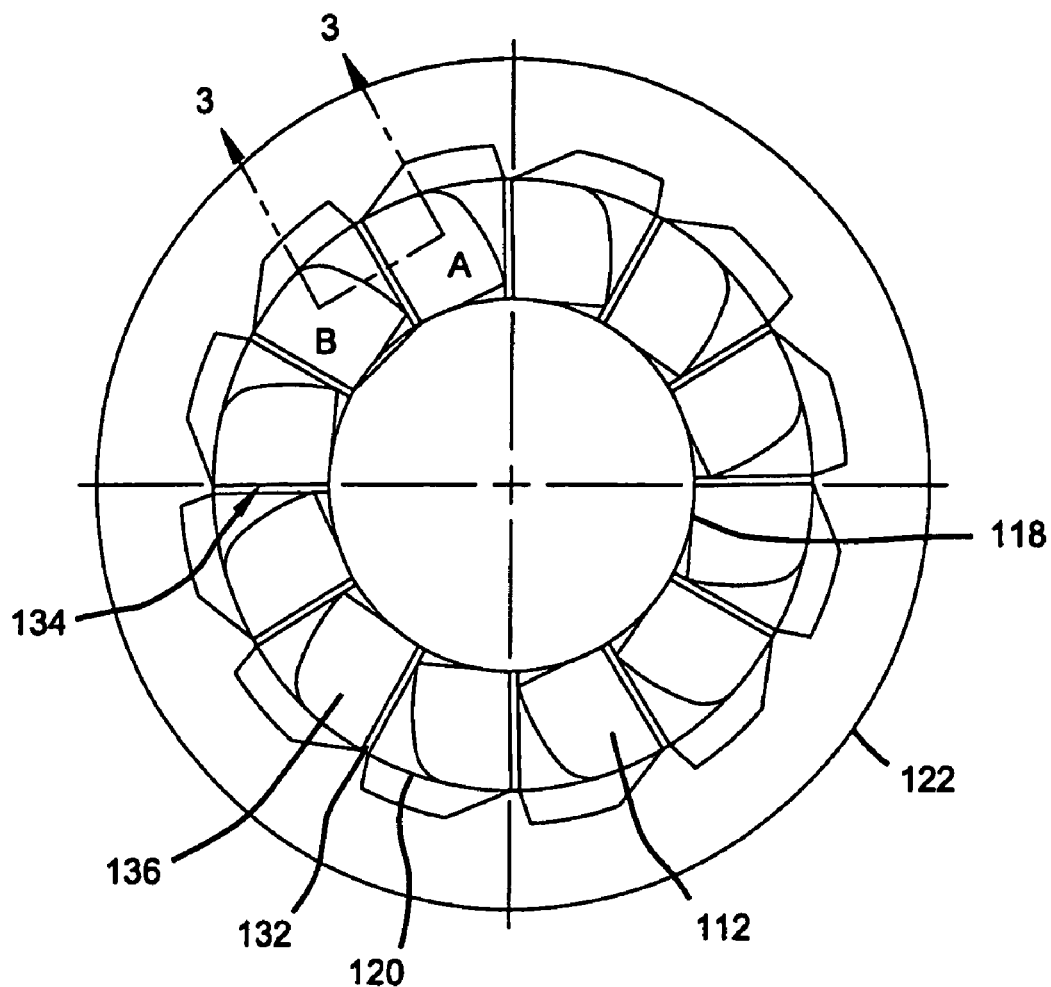
FIG. 2A is a bottom view of the fastener of FIG. 1.
FIG. 2B is a bottom view, showing a mirror image of the fastener of FIG. 2A.
Figure 3:
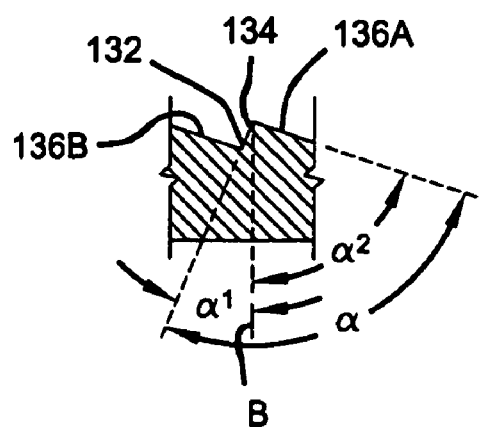
FIG. 3A is a sectional view of the fastener along axis 3A—3A of FIG. 2A.
FIG. 3B is a sectional view of the fastener along axis 3B—3B of FIG. 2B.
Figure 4:
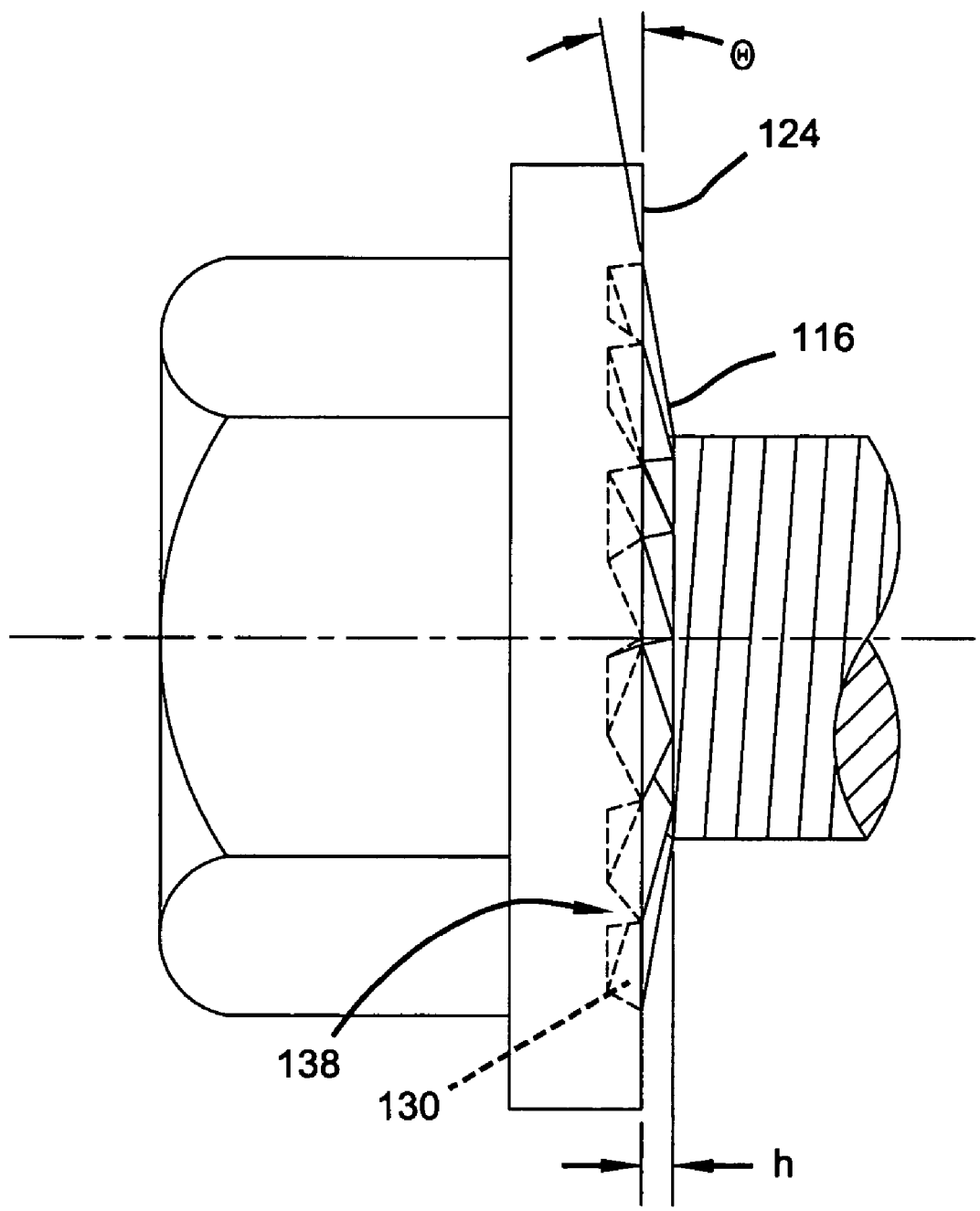
FIG. 4 is a side view of the fastener of FIG. 1.

The following description of various embodiments, including preferred embodiments, is merely exemplary in nature and is in no way intended to limit the invention, its application, or uses.

Referring to FIGS. 1–4, a fastener 100 according to the present teachings includes a shank 102, and a head 104 connected to the shank 102 at one end of the shank 102. The shank 102 has an center axis "A" and can have a plurality of threads (schematically shown). The head 104 includes a flange 106 having a clamping face 108. The clamping face 108 comes in contact with and grips a panel surface (not shown) into which the fastener 100 is inserted for use.

The clamping face 108 can be bounded by a surface defining an annular washer 110 that has an inner periphery 120, and an outer periphery 122, which coincides with the outer periphery of the flange 106. The washer 110 can be substantially flat defining a plane 124. The clamping face 108 includes a plurality of serrations 112, which extend generally radially between the inner periphery 120 and the shank 102. The serrations 112 outline a convex or ramped surface 116, which protrudes out of the plane 124 of the washer 110 and terminates at a periphery 118 of the shank 102. When the washer 110 is omitted the clamping face 108 extends to the outer periphery of the flange 106.

Figure 2A:
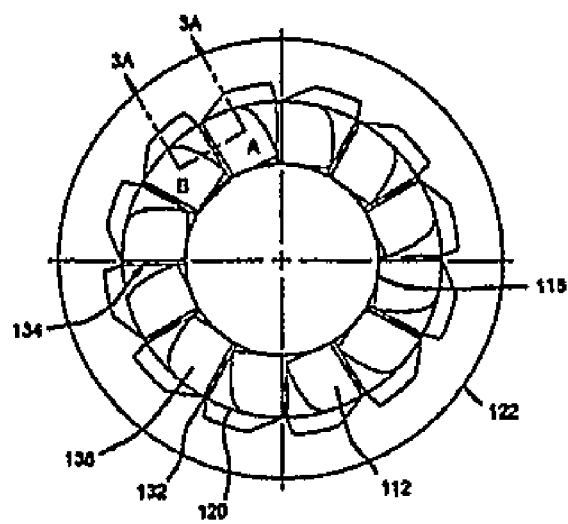

FIG. 2A illustrates an example of a fastener 100 having twelve forward serrations 112; however, one skilled in the art will recognize that the number of serrations may be dictated by the specific application of the fastener. Each serration 112 protrudes outward from the clamping face 108 and includes a root 130 embedded in the clamping face 108, and two working surfaces, which are a leading face 132 and a trailing face 136 intersecting at a gripping edge 134. The plurality of gripping edges 134 define the outline of the ramped surface 116. The height of the serration "h" in the direction of the axis A outward from the washer surface 124 and the clamping face 108, increases from the washer 110 to the shank 102. As such, the ramped surface 116 defines an acute angle θ relative the washer surface 124 in the range of 10°–15° and preferably at about 12.5°. However, one skilled in the art will recognize that the angle defined by the ramped surface may vary as dictated by the specific application of the fastener and the panel surface. When the fastener 100 is tightened or tapped into a panel surface, the gripping edges 134 enter the panel such that the ramped surface 116 becomes embedded into the panel providing a strong grip. The washer 110 can reduce marring of a surface finish of the panel surface.

Figure 3A:
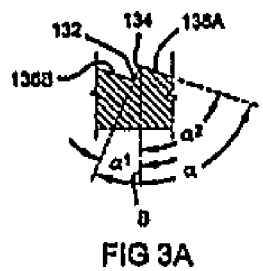
Figure 2B:
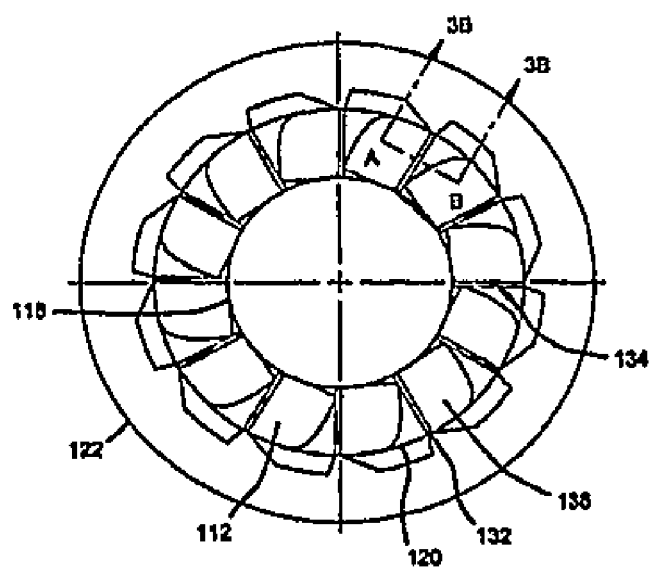
Figure 3B:
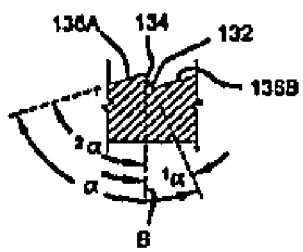

The leading and trailing faces 132, 136 of the serrations 112 extend radially from the center axis A. The trailing face is oriented at an angle in the range of 10°–25°, and preferably at about 20° with respect to the plane of flange 106 to provide an oblique surface. An included angle a is defined between the leading and trailing 132, 136 faces. As presently preferred, the included angle is about 90°. Thus, a leading face 132 is slightly reclined relative to a direction of rotation for tightening the fastener. For example, the serrations 112 as shown in FIG 3A engage in a clockwise (forward) direction for a right hand threaded fastener. It will be appreciated that a configuration which mirrors that illustrated in FIG 3A could be provided for a left hand threaded fastener, as shown in FIGS. 2B and 3B. Since the structure of FIGS 2B and 3B is identical to that of FIGS 2A and 3A, with the exception of serration orientation, similar reference numerals have been used.

Figure 5:
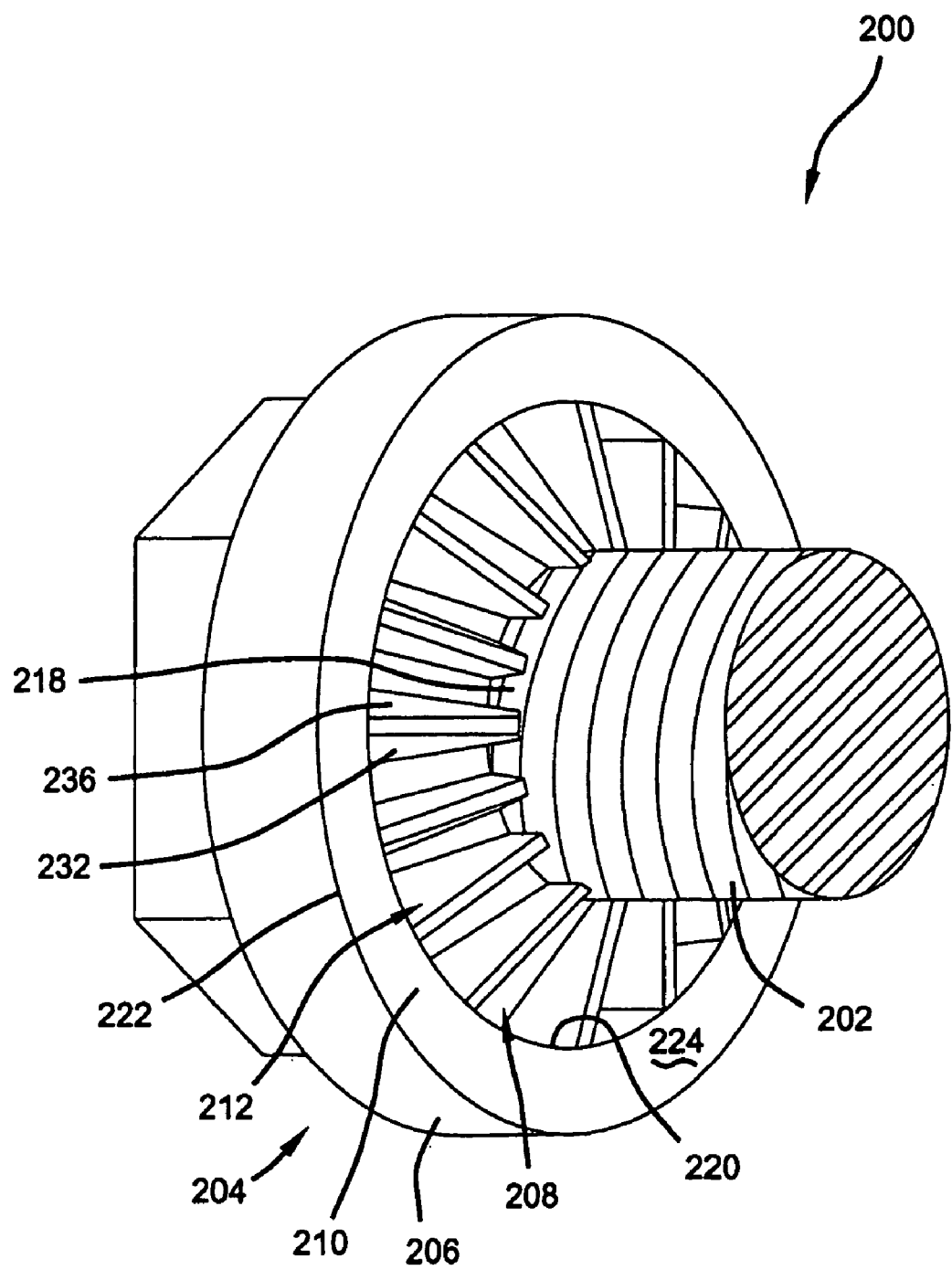
FIG. 5 is a perspective view of an alternate embodiment of the fastener according to the present teachings.
Figure 6:
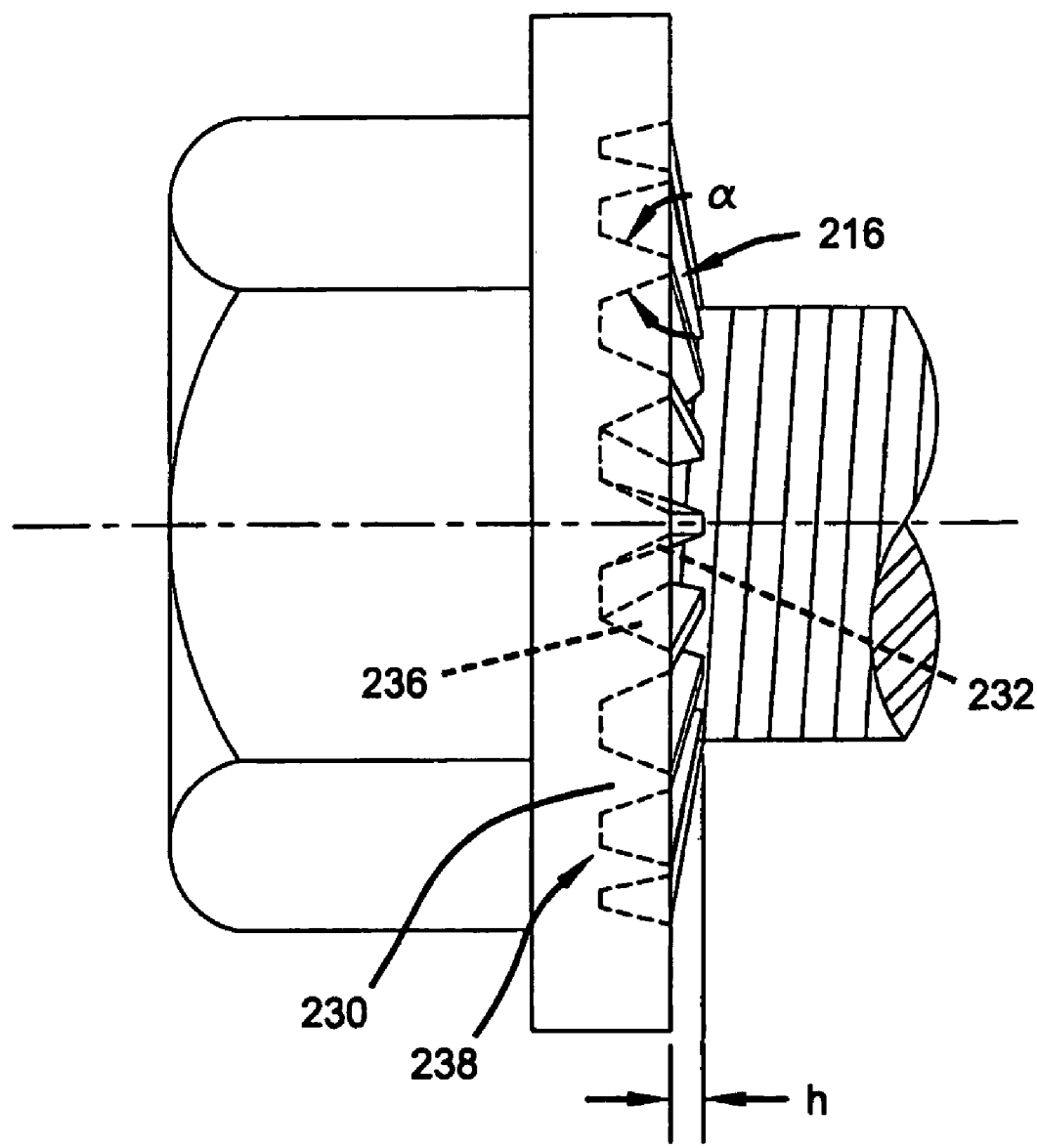
FIG. 6 is a side view of the fastener of FIG. 5.
Figure 7:
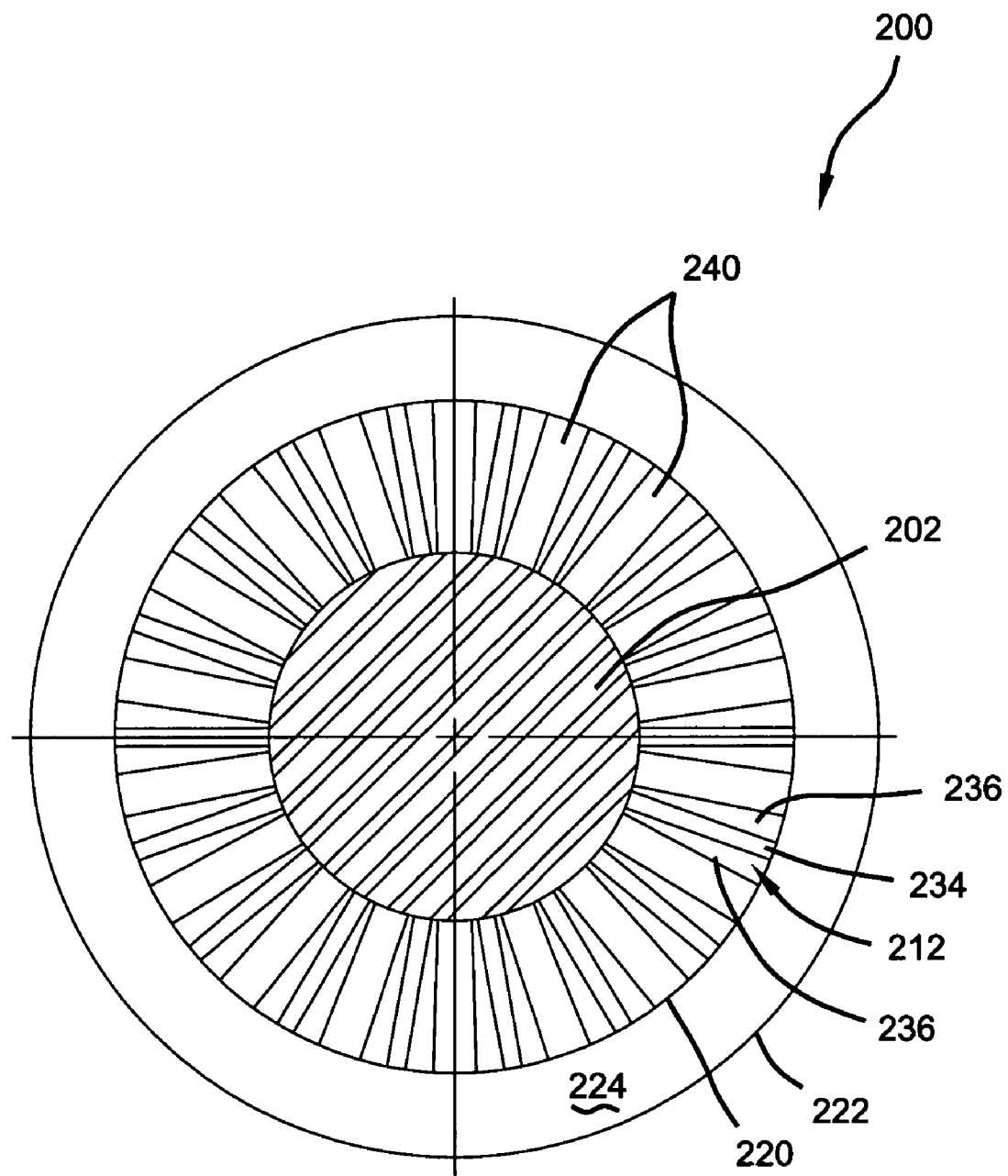
FIG. 7 is a bottom view of the fastener of FIG. 5.

FIGS. 5–7 illustrate a fastener 200 that is functional in a clockwise direction or a counter clockwise direction according to the present teachings. The fastener 200 includes a shank 202 and a head 204 connected to the shank 202 at one end of the shank 202. The head 204 includes a flange 206 having a clamping face 208. The clamping face 208 comes in contact with and grips a panel surface (not shown) into which the fastener 200 is inserted.

The clamping face 208 can be bounded by a surface defining an annular washer 210 that has an inner periphery 220, and an outer periphery 222, which coincides with the outer periphery of the flange 206. The washer 210 is substantially flat defining a plane 224. The clamping face 208 includes a plurality of serrations 212, which extend generally radially between the inner periphery 220 and the shank 202. The serrations 212 outline a ramped surface 216, which protrudes out of the washer plane 224, outward from the clamping face 208, and terminates at a periphery 218 of the shank 102. When the washer 210 is omitted the clamping face 208 extends to the outer periphery of the flange 206.

FIG. 7 illustrates an example having eighteen serrations; however, one skilled in the art will recognize that the number of serrations may be dictated by the specific application of the fastener. Each serration 212 extends outward from the clamping face 208 and has a root 230 embedded in the clamping face 208 and two working surfaces 232, 236 that terminate at a gripping edge 234. The plurality of gripping edges 234 define the outline of a convex or ramped surface 216. The height of the serration "h" in the direction of the axis A outward from the washer surface 224 and the clamping face 208, increases from the washer 210 to the shank 202. As such, the ramped surface 216 defines an acute angle θ relative to the washer surface 224 in the range of 10°–15° and preferably at about 12.5°. However, one skilled in the art will recognize that the angle defined by the ramped surface may vary as dictated by the specific application of the fastener and the panel surface. When the fastener 200 is tightened or tapped into a panel surface, the gripping edges 234 enter the panel such that the ramped surface 216 becomes embedded into the panel providing a strong grip. The washer 210 can reduce marring of a surface finish of the panel surface.

The working surfaces 232, 236 of the serrations 212 extend radially from the center axis A. The working surfaces 232, 236 can extend symmetrically from the gripping edges 234, creating a bi-directional toothed profile 238, such that the serrations 212 can engage in forward (clockwise) and reverse (counterclockwise) direction, as desired. The working surfaces 232, 236 define an included angle γ, which can be an acute angle. In the example shown in FIG. 7, the angle γ is illustrated as about 56°. The serrations 212 can be isolated, defining a gap 240 between two consecutive serrations 212, or can alternately be contiguous. The number of serrations 212 can be chosen as desired for a particular application. As used herein, the term gripping edge is used broadly to refer to a line of intersection between leading and trailing faces as shown in FIGS. 1–4, as well as a relatively thin intervening surface between leading and trailing faces as shown in FIGS. 5–7.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fastener comprising:
an axial shank having a free end;
a clamping face extending radially from the shank;
a washer bounding the clamping face defining a planar surface; and
a plurality of serrations formed on the clamping face and extending radially between the shank and the washer, wherein each serration increases in axial height from the washer to the shank defining a ramped surface projecting towards the free end and having a first portion protruding above the planar surface and a second portion extending below the planar surface.

2. The fastener of claim 1, wherein the ramped surface is disposed at an angle in the range of 10–15° with respect to the clamping face.

3. The fastener of claim 1, wherein each serration includes a leading face and a trailing face having said gripping edge disposed therebetween.

4. The fastener of claim 3, wherein the trailing face defines an oblique surface with respect to the washer.

5. The fastener of claim 4, wherein each of the gripping edges is adapted to engage in a clockwise direction.

6. The fastener of claim 5, wherein an included angle between the leading face and trailing face is about 90°.

7. The fastener of claim 4, wherein each of the gripping edges is adapted to engage in a counter clockwise direction.

8. The fastener of claim 7, wherein an included angle between the leading face and trailing face is about 90°.

9. The fastener of claim 4, wherein each of the gripping edges is adapted to engage in a selective clockwise and counterclockwise direction.

10. The fastener of claim 9, wherein an included angle between the leading face and trailing face is about 90°.

11. A fastener comprising:
an axial shank having a free end;
a clamping face extending radially from the shank;
a washer bounding the clamping face defining a planar surface; and
a plurality of serrations formed on the clamping face and extending radially from a shank periphery, contacting an outer periphery of the clamping face, wherein the shank periphery is axially displaced away from the clamping face relative to the outer periphery of the clamping face, each serration projecting toward the free end and having a first portion protruding above the clamping face and a second portion extending below the clamping face.

12. The fastener of claim 11, wherein the plurality of serrations define a ramped surface extending from the outer periphery of the clamping face to the shank periphery.

13. The fastener of claim 12, the ramped surface is disposed at an angle in the range of 10–15° with respect to the clamping face.

14. The fastener of claim 13, wherein each serration includes a leading face and a trailing face having said gripping edge disposed therebetween.

15. The fastener of claim 14, wherein each of the gripping edges is adapted to engage in a clockwise direction.

16. The fastener of claim 14, wherein each of the gripping edges is adapted to engage in a counter clockwise direction.

17. The fastener of claim 14, wherein each of the gripping edges is adapted to engage selectively in clockwise and counter clockwise directions.

18. The fastener of claim 14, wherein the trailing face defines an oblique surface with respect to the clamping face.

19. The fastener of claim 18, wherein an included angle between the leading face and trailing face is about 90°.

* * * * *

UNITED STATES PATENT AND TRADEMARK OFFICE
CERTIFICATE OF CORRECTION

PATENT NO. : 7,014,406 B2
APPLICATION NO. : 10/753219
DATED : March 21, 2006
INVENTOR(S) : Jerry Wayne Robertson It is certified that error appears in the above-identified patent and that said Letters Patent is hereby corrected as shown below:

Drawings:
Please substitute sheet 2 of 7 (showing FIG 2A and FIG 3A) for published Sheet 2 of 6, as attached.

Please add Sheet 3 of 7 (showing FIG 2B and FIG 3B), as attached

Column 4,
Line 1, before "a plurality" insert -- the clamping face including --; and after "serrations" delete "formed on the clamping face and" and insert -- immediately --.

Line 7, after "surface" insert -- and a gripping edge extending from a first point on the planar surface to a second point on the shank, said second point located axially above the planar surface --.

Line 35, before "a plurality" insert -- the clamping face including --; and after "serrations" delete "formed on the clamping face and" and insert -- immediately --.

Line 44, after "face" insert -- and a gripping edge extending from a first point on the outer periphery of the clamping face to a second point on the shank, said second point located axially above said first point --.

Line 48, after "claim 12," insert -- wherein --,

Line 51, "claim 13" should be -- claim 12 --.

Signed and Sealed this

Eleventh Day of September, 2007

JON W. DUDAS
*Director of the United States Patent and Trademark Office*